United States Patent [19] [11] 3,979,172
Sogo et al. [45] Sept. 7, 1976

[54] ICE CREAM FREEZER

[75] Inventors: Yukio Sogo, Kawasaki; Kazuo Ido, Fuchu; Kiyoshi Seko, Nagoya; Hiroshi Takahashi, Numazu, all of Japan

[73] Assignees: Snow Brand Milk Products Co., Ltd.; Fuji Machinery Co., Ltd.; Sanwa Machine Co., Inc., all of Japan

[22] Filed: Mar. 18, 1974

[21] Appl. No.: 451,861

[30] Foreign Application Priority Data
Mar. 29, 1973  Japan............................ 48-36032

[52] U.S. Cl. .............................. 425/104; 259/4 R; 222/193; 222/571
[51] Int. Cl.² ...................... A23G 9/28; A23G 9/24
[58] Field of Search.................. 259/4, 36, DIG. 32, 259/DIG. 34; 222/144.5, 145, 193, 571; 425/94, 104

[56] References Cited
UNITED STATES PATENTS

| 2,746,728 | 5/1956 | Pomerleau | 259/4 |
| 2,822,112 | 2/1958 | Bremer | 222/144.5 |
| 3,338,560 | 8/1967 | Katzer | 259/18 |
| 3,460,717 | 8/1969 | Thomas | 222/144.5 |
| 3,498,508 | 3/1970 | Francisoud | 222/571 |

Primary Examiner—Robert W. Jenkins

[57] ABSTRACT

An ice cream freezer has a solid material supplying means and is characterized in that a chamber is provided near a nozzle of a freezing box, the solid material being fed into the chamber by assist of an air force and blown against the ice cream forced out from the nozzle.

3 Claims, 3 Drawing Figures

ICE CREAM FREEZER

The present invention relates to an ice cream freezer for a soft and hard ice cream, particularly to an ice cream freezer able to supply a solid material such as pulverized nuts and almonds onto an ice cream.

Hitherto, in a ice cream freezer which is located and used at a store, it has not been possible to automatically add crushed solid material such as a nut and an almond to the ice cream discharged therefrom.

According to the present invention, there is provided an ice cream freezer which comprises a nozzle for forcing out an ice cream supplied from a freezing box, and a chamber formed around said nozzle and communicating at its outlet area with said nozzle, the wall defining said chamber being provided with a blow-out port for a solid material, said ice cream and said solid material being forced out at the outlet area of said nozzle. Thus, the ice cream freezer according to the present invention may eliminate troublesome operations happened when people intend to have the ice cream with a nut and/or an almond.

It is, therefore, a primary object of the present invention to provide an ice cream freezer capable of blowing a solid material such as a pulverized nuts or almonds against an ice cream.

It is an another object of the present invention to provide an ice cream freezer able to be set easily in an ice cream store and operated easily by a non-experienced operator.

The above and other features, objects and advantages of the invention will become apparent from the following detailed description of a preferred embodiment thereof, reference being made to the accompanying drawing, in which.

Figure 2:
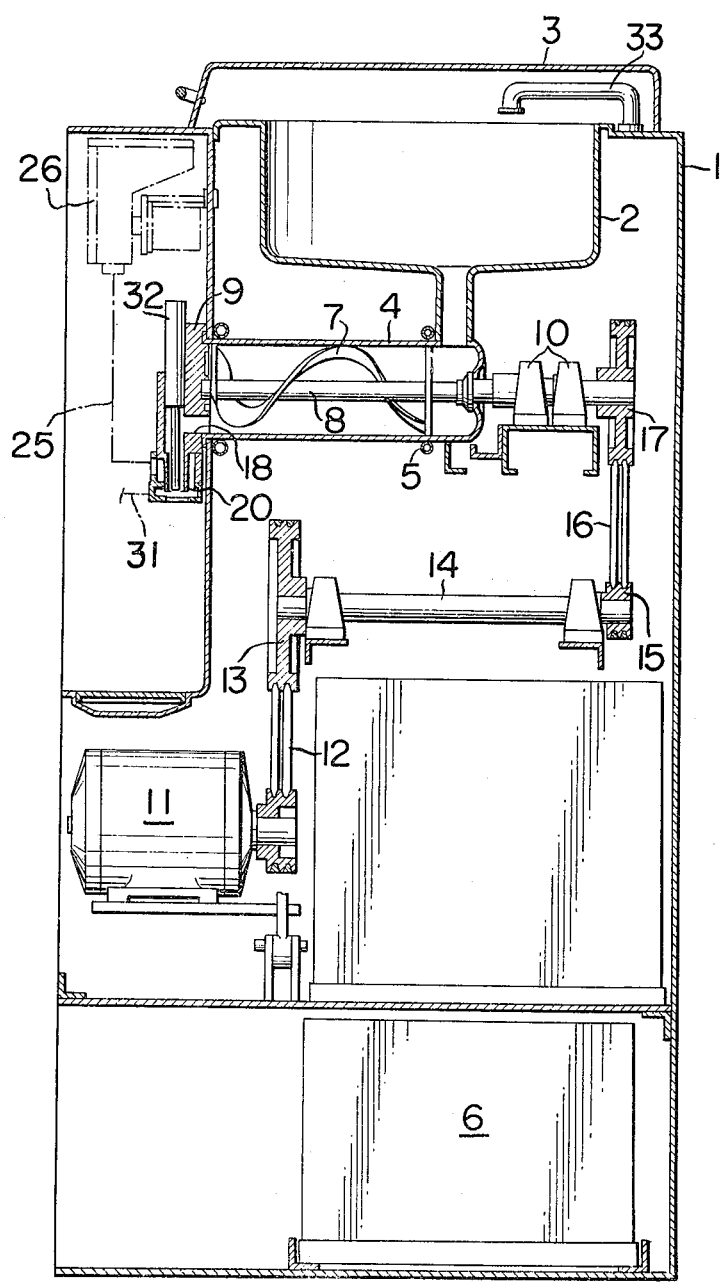
FIG. 2 is a vertically sectional view of an ice cream freezer.

Referring now to FIG. 2, an open mix tank 2 is located at the upper portion of a casing 1. The upward opened inlet of the tank 2 acts to receive a cream mix from a pipe 33 and is shielded with a cover 3 which may form a part of the top plate of the casing 1 so as to prevent the insertion of impurities in the air outside into the interior of the casing. A freezing box or freezer barrel 4 is provided below the mix tank 2 for receiving the cream mix supplied from said tank 2. In the embodiment of the present invention, a couple of mix tanks and freezer barrels are located in parallel so that different color ice cream may be made individually or mixed. A heat exchanging pipe or barrel cooling pipe 5 is coiled around the barrel 4 and connected to a freezer or refrigerator 6 housed in the lower portion of the casing 1. A shaft 8 with a helical blade 7 for agitating the cream in the barrel passes through the barrel 4 and is rotatably supported outside of the barrel 4 by bearing assemblies 9, 10. The shaft 8 is rotated by a motor 11 through a belt 12, a pulley 13, an intermediate shaft 14, a pulley 15, a belt 16 and a pulley 17. The bearing assembly 9 is formed with an outlet 18 and a vertical passage 19 communicating therewith.

Figure 1:
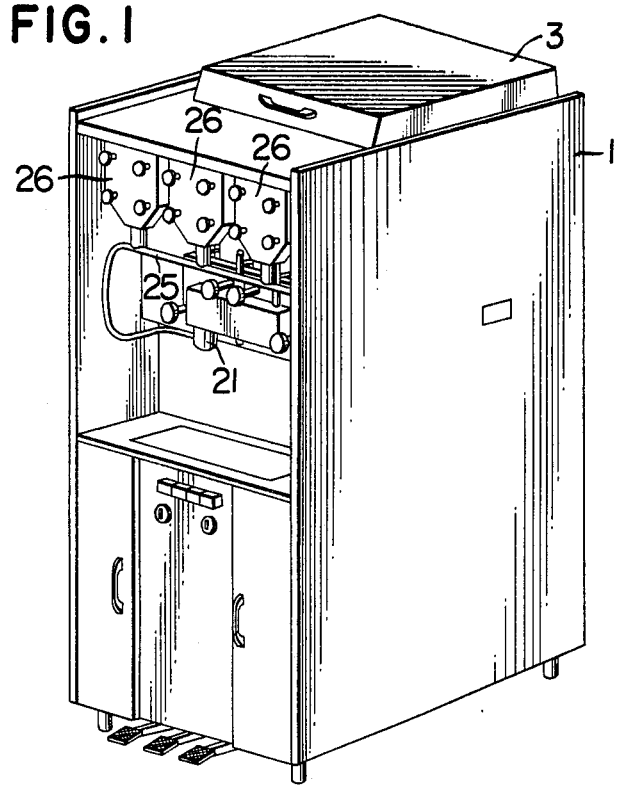
FIG. 1 is a perspective view of an ice cream freezer.
Figure 3:
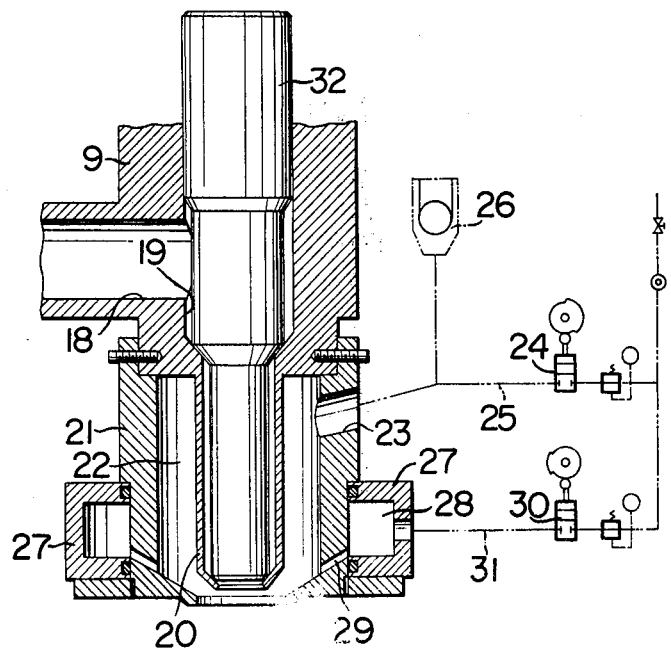
FIG. 3 is a detailed illustration of a nozzle portion used in an ice cream freezer and a schematic circuit diagram of a blow-out air system embodying this invention.

As shown in FIG. 3, the bearing assembly 9 has an elongation 20 defining the lower port of the vertical passage 19 and forming a nozzle for forcing out the agitated ice cream outwards. A housing 21 is arranged around the elongation 20 to give a suitable clearance or chamber 22 between the elongation 20 and the housing 21. A blow-out port 23 bored tangentially and obliquely downwardly is formed on the housing 21 and connected with a blower (not shown) by way of a pipe 25 having a valve 24. Further, the pipe 25 is connected to a discharge port of a pump 26 for feeding a solid material so that the solid material such as a nut fed by the pump 26 may be entered into the pipe 25 and thrown from the blowout port 23 into the chamber 22 by assist of the air force generated by the blower. The solid material such as a nut thrown in the chamber drops downwardly while being turning or circling.

The housing 21 is provided at its lower portion with an annular channel member 27 to form an annular chamber 28. The chamber 28 is opened into the lower portion of the chamber 22 through a nozzle 29 bored obliquely in the housing 21. The annular chamber 28 is connected to a blower (not shown) through a pipe 31 having a valve 30.

A valve stem 32 is axially rotatably inserted into the vertical passage 19 formed in the bearing assembly so that the nozzle may be opened when the valve stem has moved upward. The cream mix is frozen or refrigerated while being agitated in the barrel by making the refrigerator 6 and the motor 11 actuated to make the ice cream. When the valve stem moves up, the ice cream is forced out downward through the nozzle. By opening the valves 24, 30 while being operating the blower and the feed pump 26, the solid material is supplied into the chamber 22.

The solid material fed into the chamber 22 moves downward in a circle. At the same time, as the air blown obliquely through the chamber 28 and the nozzle 29 toward the ice cream which has been forced out from the elongation, the solid material in the chamber is blown against the ice cream by this air. The present invention may be modified by providing a plurality of motors 26 that several sorts of solid material would be blown optionally against the ice cream.

As apparent from the above, according to the present invention the ice cream freezer may be provided with the device which can make easily an ice cream sprinkling the solid materials such as a nut and/or an almond thereon. Particularly, the present invention will be suitable to application of the freezer intended to be put in an ice cream store.

Although only a single embodiment has been shown and described, it will be appreciated that the description is for purpose of illustration only, without there being any intent to limit the scope of the invention except insofar as defined by the appended claims.

What we claim is:

1. An ice cream dispenser comprising: a nozzle for forcing out ice cream, and means for supplying solid material onto the ice cream being forced out through said nozzle, said supplying means comprising a member surrounding said nozzle and spaced therefrom so as to form an annular chamber around said nozzle, at least one port leading into said annular chamber, and means for feeding solid material through said at least one port and through said chamber onto the ice cream being forced out through said nozzle, said feeding means comprising means for blowing said solid material through said port, and a valve for controlling the feeding of said solid material, and supplemental means for blowing said solid material against the ice cream being forced out through said nozzle.

2. An ice cream dispenser according to claim 1, said supplemental blowing means comprising a further nozzle open toward said chamber, a further annular chamber around said annular chamber and communicating therewith through said further nozzle, and means for blowing air into said further annular chamber.

3. An ice cream dispenser according to claim 2, comprising a valve provided between said further annular chamber and said supplemental means for blowing air so as to regulate the amount of air introduced into said further annular chamber.

* * * * *